United States Patent
Haque et al.

(10) Patent No.: US 10,437,621 B2
(45) Date of Patent: Oct. 8, 2019

(54) MONITORING AND MANAGING APPLICATIONS ON VIRTUAL MACHINES USING A PROXY AGENT

(71) Applicant: Cisco Technology, Inc., San Jose, CA (US)

(72) Inventors: Shaheedur Reza Haque, London (GB); Matthew Turner, Cambridge (GB); Vanson Lim, Cambridge, MA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 299 days.

(21) Appl. No.: 14/693,019

(22) Filed: Apr. 22, 2015

(65) Prior Publication Data
US 2016/0314010 A1    Oct. 27, 2016

(51) Int. Cl.
G06F 9/455    (2018.01)
G06F 9/46    (2006.01)

(52) U.S. Cl.
CPC ............. *G06F 9/45558* (2013.01); *G06F 2009/45591* (2013.01); *G06F 2009/45595* (2013.01)

(58) Field of Classification Search
None
See application file for complete search history.

(56) References Cited

U.S. PATENT DOCUMENTS

| | | | | |
|---|---|---|---|---|
| 7,861,244 B2* | 12/2010 | Vasile | ................. | G06F 11/3409 718/1 |
| 8,813,065 B2 | 8/2014 | Zygmuntowicz et al. | | |
| 9,176,759 B1* | 11/2015 | Sahasranaman | ..... | G06F 9/45558 |
| 9,712,604 B2* | 7/2017 | Sinha | ......................... | G06F 9/00 |
| 9,734,325 B1* | 8/2017 | Neumann | ............. | H04L 9/0877 |
| 2006/0143359 A1* | 6/2006 | Dostert | ................... | G06F 9/544 711/6 |
| 2007/0050766 A1* | 3/2007 | Pomerantz | ............. | G06F 9/455 718/1 |
| 2010/0306759 A1* | 12/2010 | Kohler | .................. | G06F 9/4484 717/174 |
| 2012/0291021 A1* | 11/2012 | Banerjee | ................. | G06F 8/665 717/173 |
| 2013/0152076 A1* | 6/2013 | Patel | ................... | G06F 9/45558 718/1 |
| 2013/0185715 A1* | 7/2013 | Dunning | ............. | G06F 9/45558 718/1 |

(Continued)

OTHER PUBLICATIONS

"Managing Data More Effectively in Virtualized Environments with CommVault Simpana Universal Virtual Software Agent", CommVault, 2 pages.

*Primary Examiner* — Bradley A Teets
(74) *Attorney, Agent, or Firm* — Polsinelli PC

(57) ABSTRACT

In some implementations, a method includes receiving, from a virtual machine, a request to create a proxy agent configured to monitor an application executing on the virtual machine, wherein the proxy agent is associated with the virtual machine and wherein the virtual machine is unable to host the proxy agent. The method also includes creating the proxy agent based on the request to create the proxy agent. The method further includes receiving monitoring data for the application executing on the virtual machine via the proxy agent. The method further includes transmitting a status of the application or the monitoring data to a server.

18 Claims, 8 Drawing Sheets

(56) References Cited

U.S. PATENT DOCUMENTS

| | | | |
|---|---|---|---|
| 2013/0275375 A1* | 10/2013 | Nickolov | G06F 9/4856 707/636 |
| 2013/0297668 A1 | 11/2013 | McGrath et al. | |
| 2013/0297672 A1 | 11/2013 | McGrath et al. | |
| 2013/0311645 A1* | 11/2013 | Nagami | G06F 11/0709 709/224 |
| 2014/0075432 A1 | 3/2014 | McGrath et al. | |
| 2014/0189691 A1* | 7/2014 | Lee | G06F 9/45533 718/1 |
| 2014/0250215 A1* | 9/2014 | Bowen | G06F 21/57 709/223 |
| 2014/0351613 A1* | 11/2014 | Kansal | G06F 1/3203 713/320 |
| 2015/0082179 A1* | 3/2015 | Ayanam | H04L 67/143 715/736 |
| 2015/0154039 A1* | 6/2015 | Zada | G06F 9/5011 718/1 |
| 2015/0295800 A1* | 10/2015 | Bala | H04L 67/2819 709/224 |

* cited by examiner

MONITORING AND MANAGING APPLICATIONS ON VIRTUAL MACHINES USING A PROXY AGENT

FIELD OF THE INVENTION

The present disclosure relates to virtual machines. More specifically, the present disclosures relates to monitoring and managing applications on virtual machines.

BACKGROUND

Virtualization allows multiplexing of the resources of an underlying computing device (e.g., a host computing device or host device) to be shared between one or more virtual machines (VMs). The underlying computing device hosts the one or more VMs. A virtual machine (VM) may be a software implementation of a physical device (e.g., a computing device such as a desktop computer, a laptop computer, routers, switches, etc.). A VM may include an operating system (which may be referred to as a guest operating system) and may be able to perform various functions/operations and/or execute an application, a service, a daemon, a script, a software module, and/or a software component that resides on the VM. The underlying computing device may allocate various amounts of its resources to each of the one or more VMs. Each of the one or more VMs may be able to use the allocated resources to perform the various functions/operations. Each VM may also be able to use the allocated resources to execute its guest operating system, applications, services, daemons, scripts, software modules, and/or software components. The underlying computing device (which hosts the VMs) may emulate the underlying hardware for the guest operating system, making the use of the VM transparent to a user.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings. The appended drawings, however, illustrate only some example features of the present disclosure and are therefore not to be considered limiting, for the description may admit to other effective features.

Figure 1:
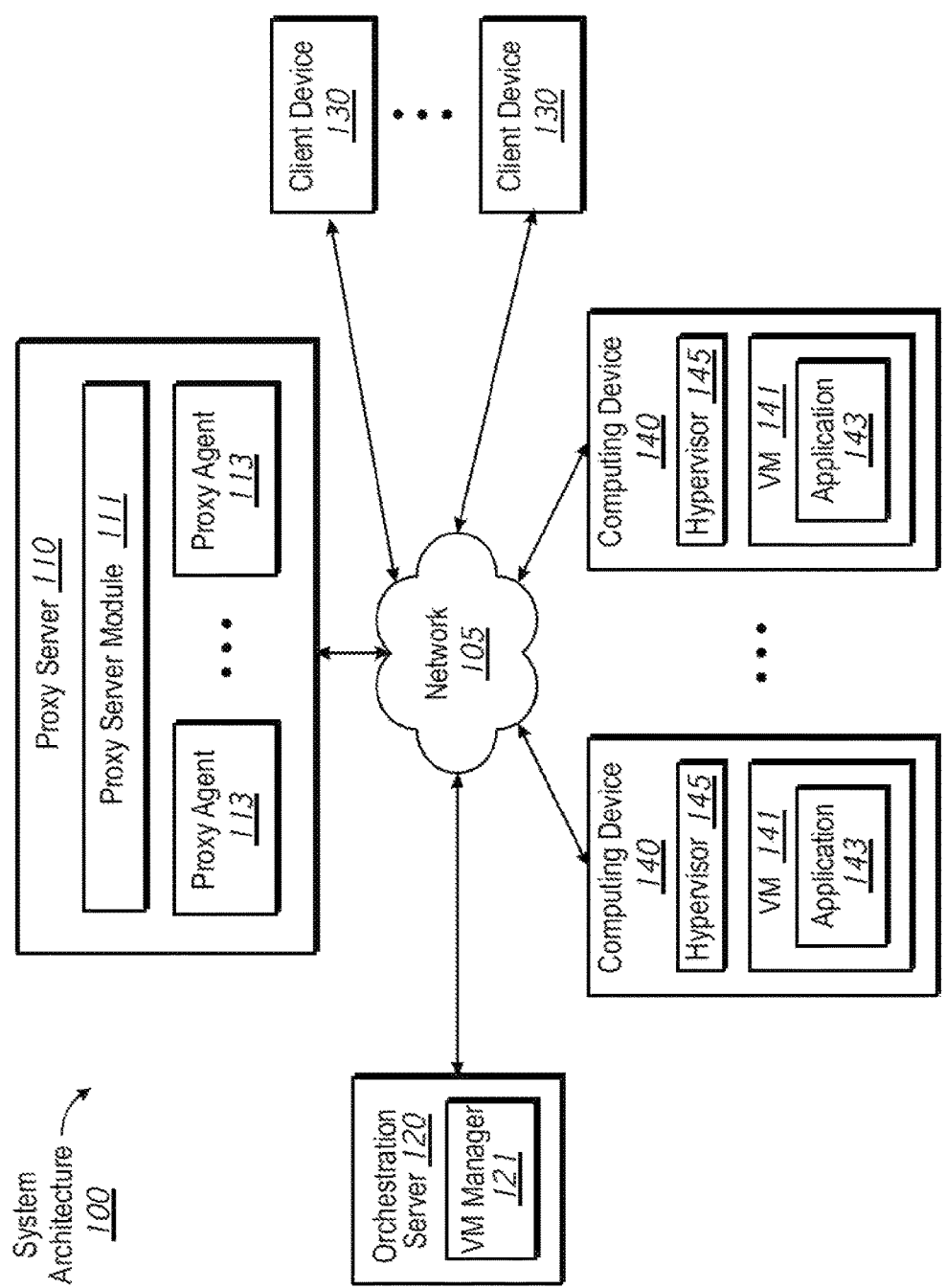
FIG. 1 is a block diagram illustrating a system architecture, in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described herein in order to provide a thorough understanding of the illustrative implementations shown in the accompanying drawings. However, the accompanying drawings show only some example aspects of the present disclosure and are therefore not to be considered limiting. Those of ordinary skill in the art will appreciate from the present disclosure that other effective aspects and/or variants do not include all of the specific details described herein. Moreover, well-known systems, methods, components, devices and circuits have not been described in exhaustive detail so as not to unnecessarily obscure more pertinent aspects of the implementations described herein.

Overview

Various implementations disclosed herein include apparatuses, systems, and methods for monitoring and/or managing applications on virtual machines. For example, in some implementations, a method includes receiving, from a virtual machine, a request to create a proxy agent configured to monitor an application executing on the virtual machine, wherein the proxy agent is associated with the virtual machine and wherein the virtual machine is unable to host the proxy agent. The method also includes creating the proxy agent based on the request to create the proxy agent. The method further includes receiving monitoring data for the application executing on the virtual machine via the proxy agent. The method further includes transmitting a status of the application or the monitoring data to a server.

In other implementations, a method includes booting a virtual machine using a first disk image. The method also includes transmitting, to a proxy server, a request to create a proxy agent configured to monitor an application of the virtual machine using the first disk image, wherein the proxy agent is associated with the virtual machine and wherein the virtual machine is unable to host the proxy agent. The method further includes booting the virtual machine using a second disk image, wherein the second disk image comprises the application

DETAILED DESCRIPTION

As discussed above, virtualization allows multiplexing of the resources of an underlying computing device (e.g., a host computing device or host device) to be shared between one or more VMs. Virtualization may allow for a reduction in capital expenditures and/or operating expenditures. For example, capital expenditures may be reduced because physical/hardware device may not be used. In another example, operating expenditures may be reduced because management and/or maintenance of the VMs may be cheaper, quicker, and/or more efficient. Many system architectures or environments may use virtualization on a larger scale. For example, multiple server computers and/or desktop computers may be virtualized as VMs running on a host computing device. In another example, Network Function Virtualization (NFV) may use virtualization related technologies to virtualize classes of network functions. For example, routing functions (e.g., a class of network functions that routes packets/data) that may generally be performed by a router (e.g., a physical/hardware device) may be virtualized into a virtual router (e.g., a type of VM). The system architectures may use applications, services, daemons, scripts, software modules, and/or software components that are executing within one or more VMs. For example, a VM may execute a web server that hosts a website. In another example, a VM may execute a service or an application that provides firewall services for the system architecture.

The system architectures may use one or more orchestration systems (e.g., one or more computing devices) to add, remove, configure, and/or manage VMs. For example, a server computer may include a VM Manager which may be used to add, remove, configure, and/or modify VMs on various host devices. Although the orchestration systems may be able to add, remove, configure, and/or manage VMs, the orchestration VMs may not be able to communicate with, configure, and/or determine the status of applications (or services, daemons, scripts, software modules, software components, etc.) executing within the VMs. A VM may host or include an agent (e.g., an application, service, software module, etc.) that may be used to by the orchestration system to interface with an application executing within the VM. For example, the agent may monitor the status of an application executing on the VM and may transmit data (e.g., monitoring data) indicating the status of the application to the orchestration system. A VM that includes an agent may be referred to as a cartridge.

However, some VMs may not be able to host an agent. For example, a VM may not have the appropriate software environment (e.g., may not have a Java Virtual Machine (JVM), may not have Bash scripting) that may be needed to host the agent (e.g., to execute or operate the agent). In another example, the VM may not allow the disk image of the VM to be modified (e.g., may not allow additional software and/or applications to be installed on the VM). When a VM is unable host an agent (e.g., unable to host an agent natively), the orchestration system may not be able to communicate with, configure, and/or monitor applications (or services, daemons, software modules, etc.) executing on the VM. Thus, VMs which are unable to host an agent may not be usable because the orchestration system may be unable to applications on these VMs.

Some example embodiments described herein may allow an orchestration system to communicate with, configure, and/or monitor applications (or services, daemons, software modules, etc.) executing on a VM that is unable to host an agent. This may allow the orchestration to determine the status of an application executing on a VM and/or configure the application even though the VM is unable to host the agent. This may also allow an orchestration system to be able to work with a greater variety of VMs (e.g., VMs that are unable to host an agent).

FIG. 1 is a block diagram illustrating a system architecture 100, in accordance with some embodiments. The system architecture includes a proxy server 110, an orchestration server 120, client devices 130, a network 105, and computing devices 140. Each of the proxy server 110 and the orchestration server 120 may be one or more computing devices (such as a rack-mount server, a router computer, a server computer, a personal computer, a mainframe computer, a smartphone, a personal digital assistant (PDA), a laptop computer, a tablet computer, a desktop computer, etc.). Each of the client devices 130 may also be a computing device (e.g., a personal computer, a smartphone, a personal digital assistant (PDA), a laptop computer, a tablet computer, a desktop computer, etc.). The network 105 may include one or more of a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

As illustrated in FIG. 1, the system architecture 100 includes VMs 141 which are hosted by computing devices 140. The computing devices 140 may be referred to as host computing devices or host devices. Each computing device 140 includes a hypervisor 145. In one embodiment, a hypervisor 145 may be a software layer that may provide virtualization functions and/or services. The hypervisor 145 may also be referred to as a virtual machine monitor (VMM). The hypervisor 145 may emulate the hardware used by the VM 141. This may make the virtualization of the VM 141 transparent to a user of the VM 141 (e.g., the user may not realize that the VM 141 is not a physical device). In one embodiment, the hypervisor 145 may operate on top of an operating system (not shown in the figures) of a computing device 140. In another embodiment, the hypervisor 145 may be a bare-metal hypervisor that may operate directly on the hardware of the computing device 140. Although FIG. 1 illustrates that a computing device 140 may host a single VM 141, it shall be understood that in other embodiments, a computing device 140 may host multiple VMs.

Each VM 141 includes an application 143. The application 143 may be used and/or accessed by client devices 130. For example, the application 143 may be a web server that may host one or more webpages accessed by the client devices 130. In another example, the application 143 may be a word processing program used by the client devices 130. Although FIG. 1 illustrates that each VM 141 may include an application 143, it shall be understood that in other embodiments, a VM 141 may include multiple applications. Furthermore, although the description may refer to applications (e.g., application 143), it shall be understood that in other embodiments, a VM 141 may include a service (e.g., a web service), a daemon, a script, a software module, a software component, etc., that may be used and/or accessed by client devices 130.

In one embodiment, the computing devices 140 may be part of a cloud (e.g., a virtual private cloud (VPC)). A cloud may be a collection resources that are operated by a cloud service provider. For example, the cloud may include one or more of infrastructure resources (e.g., server computers, data storage, etc.), computing resources (e.g., mainframe computers, server computers, etc.), network resources (e.g., routers, switches, etc.), and software resources (e.g., applications, services, web services, etc.). The computing devices 140 may be resources of the cloud that may be used to host the VMs 141.

The system architecture 100 may use the orchestration server 120 to add, remove, configure, modify (e.g., add or remove virtual hardware), and/or manage VMs 141. The orchestration server 120 includes a VM manager 121 which may communicate with the hypervisors 145 of the computing devices 140 to add, remove, configure, modify (e.g., add or remove virtual hardware), and/or manage VMs 141. For example, the VM manager 121 may transmit messages, data, packets, etc., to a hypervisor 145 to indicate that a new VM should be created or started. The hypervisor 145 may initiate the operation or execution of the new VM based on the messages, data, packets, etc. In another example, the VM manager 121 may transmit messages, data, packets, etc., to a hypervisor 145 to indicate that an existing VM 141 should be removed (e.g., stopped, terminated, shut down, etc.). The VM manager 121 may also communicate with a hypervisor 145 to determine the status of a VM 141 (e.g., to determine whether a VM 141 has started, is operating, has crashed, etc.).

As discussed above, the VM manager 121 may communicate with an application 143 using an agent (not shown in the figures) that may be hosted by a VM 141 (e.g., that may reside, operate, and/or execute within the VM 141). The agent may allow the VM manager 121 to determine the status of an application 143 on a VM 141 and/or manage an application 143 on a VM 141. However, as discussed above, some of the VMs 141 may not be able to host an agent. For example, a VM 141 may not have an appropriate software environment or may not allow the disk image of the VM 141 to be modified.

In one embodiment, a VM 141 may be unable to host an agent (e.g., unable to host an agent natively). The VM 141 (that may be unable to host an agent) may include a first disk image and a second disk image (as discussed in more detail below). The VM 141 may boot (e.g., may start up, may begin execution) using the first disk image. The first disk image may include a configuration module (not shown in FIG. 1). The configuration module may be an operating system, an application, a service, a daemon, a script, a software module, and/or a software component. The configuration module may transmit (e.g., may cause the VM 141 to transmit) a request to create or instantiate a proxy agent 113, to the proxy server 110. In one embodiment, the configuration module may communicate with the orchestration server 120 and/or VM manager 121 to obtain an identifier. For example, the configuration module may transmit a request for the identifier (e.g., a number, an alphanumeric value, etc.) to the orchestration server 120 and/or VM manager 121. The configuration module may receive the identifier from the orchestration server 120 and/or VM manager 121. The identifier may allow the orchestration server 120 and/or VM manager 121 to identify the application 143 and/or the VM 141 where the application 143 is executing. The identifier may also allow the orchestration server 120 and/or VM manager 121 to identify the proxy agent 113 associated with the application 143 and/or VM 141. The request to create or instantiate a proxy agent 113 may include the identifier or the configuration module may transmit the identifier to the proxy server 110 separately. The configuration module may also transmit (e.g., may cause the VM 141 to transmit) a plugin module (not shown in FIG. 1) to the proxy server 110. The plugin module may allow proxy agent to communicate with and/or manage an application 143 (as discussed in more detail below).

In one embodiment, the configuration module may also perform provisioning operations for the VM 141 (e.g., may provision the VM 141). For example, the configuration module may configure parameters, settings, usernames, passwords, network ports, internet protocol (IP) addresses, etc., that may be used by the VM 141 and/or the application 143 of the VM 141. In another embodiment, the configuration module may boot (e.g., reboot or restart) the VM 141 and may cause the VM 141 to boot using a second disk image. For example, the configuration module may instruct a boot loader (not shown in FIG. 1) of the VM 141 to boot the VM 141 using the second disk image. The second disk image may include the application 143 and may also include an operating system (not shown in the figures). In one embodiment, the configuration module may obtain information for performing provisioning operations (e.g., information indicating values for parameters, settings, usernames, passwords, network ports, internet protocol (IP) addresses, etc.) from a separate computing device, such as a server computer. For example, the configuration module may communicate with a server computer (e.g., may transmit a message to the server computer) to obtain the parameters, settings, usernames, passwords, network ports, internet protocol (IP) addresses, etc., that may be used to provision the VM 141. In another embodiment, the VM 141 may be updated to include the first disk image (which includes the configuration module). For example, the VM 141 may be received from an external source, such as a vendor. The VM 141 may not include the first disk image when the VM 141 is received from the external source. The VM 141 may be updated and/or modified to include the first disk image.

In one embodiment, the first disk image and the second disk image may be located on different disk partitions (e.g., virtual disk partitions) a virtual disk of the VM 141 (as discussed in more detail below). In another embodiment, the first disk image and the second disk image may be located on different virtual disks of the VM 141 (as discussed in more detail below).

As illustrated in FIG. 1, the proxy server 110 includes a proxy server module 111 and proxy agents 113. As discussed above, the proxy server 110 may receive a request from VM 141 (e.g., from a first disk image of a VM 141) to create or instantiate a proxy agent 113. The proxy agent 113 may allow the proxy server 110 and/or the orchestration server 120 to communicate with and/or manage an application 143 that is on a VM 141 that is unable to host an agent (e.g., unable to host an agent natively). The proxy server module 111 may create and/or instantiate a proxy agent 113 based on the request received from the VM 141. The proxy agent 113 may be associated with the application 143 on the VM 141. The proxy agent 113 may also be associated with the VM 141 that transmitted the request to create and/or instantiate the proxy agent 113. In one embodiment, the request to create and/or instantiate the proxy agent 113 may include an identifier that may be used to identify the VM 141 and/or the application 143 that is associated with the proxy agent 113. The proxy server module 111 may create the proxy agent 113 based on the identifier. For example, the proxy server module 111 may include the identifier as part of the proxy agent 113.

In one embodiment, the proxy server 110 may receive a plugin module from the VM 141 (e.g., from the first disk image of the VM 141). The plugin module (not shown in FIG. 1) may allow the proxy agent 113 to communicate with the application 143. For example, the plugin module may be able to process and/or understand the format of messages received from the application 143. The proxy agent 113 may monitor the application 143 executing on the VM 141 using the plugin module. For example, the application 143 may periodically send monitoring data, such messages, reports, packets, etc., indicating the status of the application 143 (e.g., whether the application 143 is operating normally, has encountered an error, etc.) to the proxy agent 113. In another example, the proxy agent 113 may periodically query the application 143 for monitoring data (e.g., may periodically request monitoring data from the application 143). In one embodiment, the proxy server module 111 may determine the status of the application 143 based on the monitoring data. The proxy server module 111 may transmit the status of the application 143 to the orchestration server 120. In another embodiment, the proxy server module 111 may transmit the monitoring data received from the proxy agent 113 to the orchestration server 120 and the orchestration server 120 and/or the VM manager 121 may determine the status of the application 143 based on the monitoring data.

In one embodiment, the proxy server module 111 may also transmit the identifier associated with the VM 141 and/or application 143 along with the monitoring data and/or status to the orchestration server 120. The identifier may allow the orchestration server 120 to determine which VM 141 and/or application 143 the monitoring data and/or status is for.

In one embodiment, the proxy agent 113 may also perform provisioning operations for the VM 141 (e.g., may provision the VM 141). For example, the proxy agent 113 may configure parameters, settings, usernames, passwords, network ports, internet protocol (IP) addresses, etc., that may be used by the VM 141 and/or the application 143 of the VM 141.

In one embodiment, the system architecture 100 may allow the orchestration server 120 and/or the VM manager 121 to communicate with and/or monitor applications 143 (or services, daemons, software modules, etc.) executing on VMs 141 that are unable to host an agent. The system architecture 100 may also allow the orchestration server 120 and/or the VM manager 121 to determine the status of an application 143 executing on a VM 141 even though the VM 141 is unable to host the agent. The system architecture 100 may further allow the orchestration server 120 and/or the VM manager 121 to configure and/or manage an application 143 executing on a VM 141 even though the VM 141 is unable to host the agent. This may also allow an orchestration system to be able to work with a greater variety of VMs.

Figure 2:
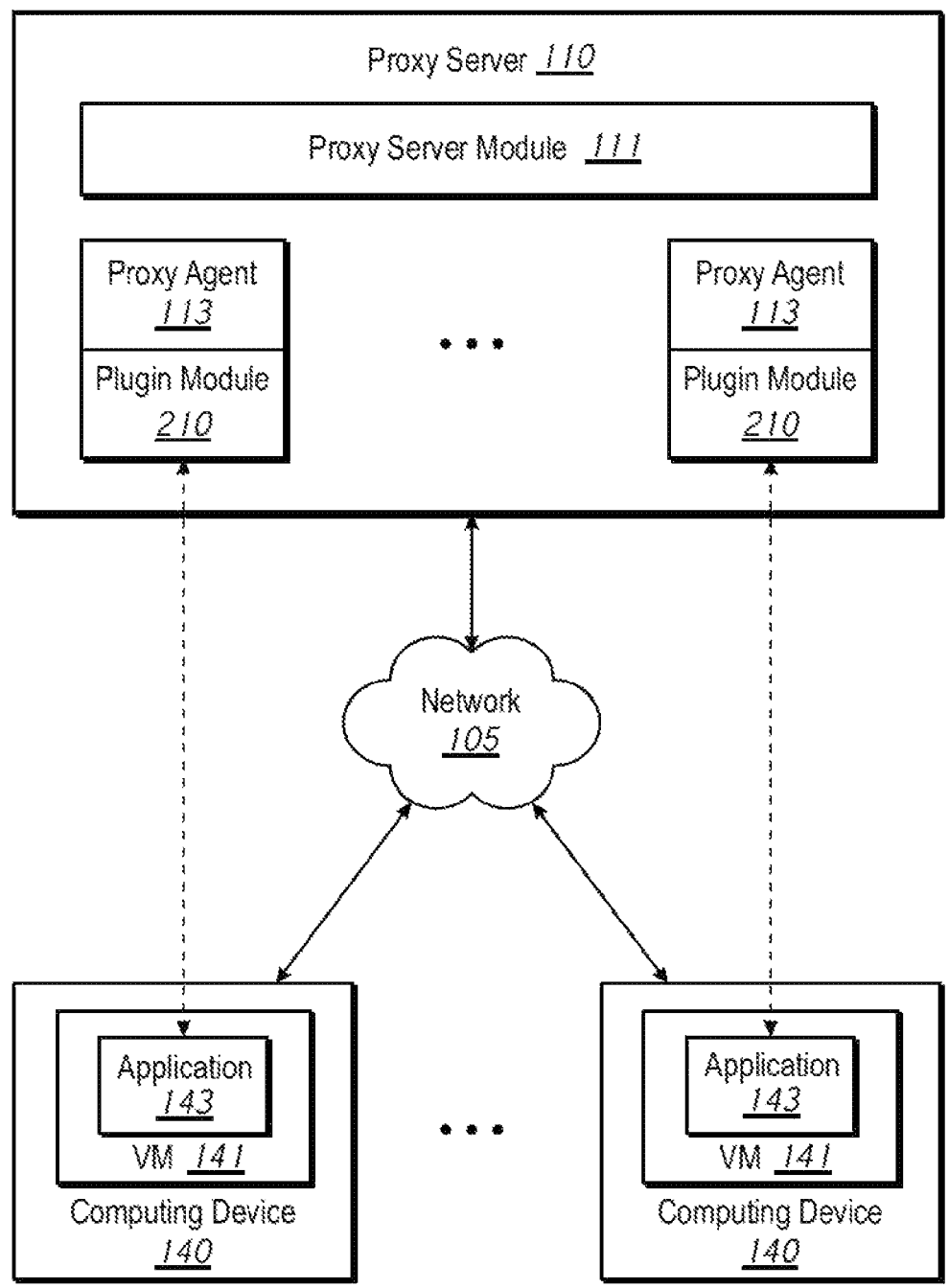
FIG. 2 is a block diagram illustrating a proxy server, in accordance with some embodiments.

FIG. 2 is a diagram illustrating a proxy server 110, in accordance with some embodiments. The proxy server 110 includes a proxy server module 111 and proxy agents 113. As discussed above, the proxy server 110 may receive a request from a VM 141 (e.g., from a first disk image of a VM 141) to create or instantiate a proxy agent 113. The proxy server module 111 may create and/or instantiate a proxy agent 113 based on the request received from the VM 141. The proxy server module 111 also receive an identifier that may be used to identify the VM 141 and/or the application 143 that is associated with the proxy agent 113 and may create the proxy agent 113 based on the identifier.

As illustrated in FIG. 2, each proxy agent 113 is associated with a VM 141 and/or an application 143 executing on a VM 141 (as indicated by the dashed lines between a proxy agent 113 and an application 143/VM 141). The VMs 141 may be unable to host an agent (e.g., unable to host an agent due to a software environment of the VM 141). Each VM 141 is hosted by a computing device 140 (e.g., each VM 141 resides on a computing device 140). Proxy agents 113 may allow the proxy server 110 and/or an orchestration server to communicate with and/or manage an application 143 that is on a VM 141 that is unable to host an agent.

In one embodiment, the proxy agent 113 may be a generic or reusable agent. For example, the proxy agent 113 may an application, service, daemon, software module, software component, etc., that may be created, executed, and/or instantiated multiple times. Because the proxy agent 113 is a generic or reusable agent, the proxy agent 113 may use a plugin module 210 to communicate with an application 143. As discussed above, the proxy server 110 may receive a plugin module 210 from the VM 141 (e.g., from the first disk image of the VM 141). The plugin module 210 may be VM specific and/or application specific. For example, one type of plugin module 210 specific to a type of VM (e.g., a virtual router). In another example, another type of plugin module 210 may be specific to a type of application 143 (e.g., a particular web server distributed by a particular vendor). Because the proxy agent 113 may be a generic or reusable agent, the VM specific and/or application specific plugin module 210 may allow the proxy agent 113 to communicate with a wide variety of different VMs and/or applications. For example, the proxy agent 113 may receive a message in a first format from an application 143 and/or a VM 141. The plugin module 210 may translate the message to a second format that may be used by the orchestration server and/or the proxy agent 113. In another example, the proxy agent 113 may receive a message in a first format from the orchestration server and plugin module 210 may translate the message to a second format that may be used by a VM 141 and/or application 143 associated with the proxy agent 113. In one embodiment, the plugin module 210 may also include an application, software component, software module, etc., that may be used to communicate with a VM 141 and/or an application 143. For example, the plugin module 210 may include a secure shell (SSH) client that may be used to communicate with the VM 141 and/or the application 143. Although the plugin module 210 is illustrated as separate from the proxy agent 113, in other embodiments, the plugin module 210 may be part of the proxy agent 113.

In one embodiment, a plugin module 210 may allow the proxy agent 113 to perform provisioning operations for a VM 141 (e.g., to provision the VM 141). For example, the plugin module 210 may provide information about configuration parameters, settings, network ports, usernames, passwords, IP address, application settings, operating system settings, etc., that may be used to provision the VM 141. The proxy agent 113 may use the information to provision a VM 141 and/or to setup an application 143 (e.g., to install or configuration the application 143).

In another embodiment, the plugin module 210 may allow the proxy agent 113 to monitor an application 143 executing on the VM 141. For example, the application 143 may periodically send monitoring data, such messages, reports, packets, etc., indicating the status of the application 143 to the proxy agent 113. The proxy agent 113 may use the plugin module 210 translate, understand, and/or interpret the monitoring data. In another example, the proxy agent 113 may periodically transmit a message, packet, etc., to query the application 143 for monitoring data. The proxy agent 113 may use the plugin module 210 to translate the monitoring data (e.g., message, packet, etc.) to a format that the VM 141 and/or the application 143 may understand or use. As discussed above, the proxy server module 111 may determine the status of an application 143 based on the first monitoring data. The proxy server module 111 may transmit the status of the application 143 to the orchestration server. The proxy server module 111 may also transmit the monitoring data received from the proxy agent 113 to the orchestration server and the orchestration server and/or a VM manager may determine the status of the application 143 based on the monitoring data. The proxy server module 111 may also transmit the identifier associated with the VM 141 and/or application 143 along with the monitoring data and/or status to the orchestration server 120.

In one embodiment, the plugin module 210 may allow the proxy agent 113 to configure an application 143 executing on the VM 141. For example, the plugin module 210 may translate commands to change settings, parameters, and/or the operation of the application 143, to a format that may be usable or understood by the application 143. This may allow the orchestration server 120 and/or proxy server 110 to configure and/or modify the application 143. For example, the proxy agent 113 and/or plugin module 210 may allow the orchestration server 120 and/or proxy server 110 to change the port number used by the application 143.

Figure 3:
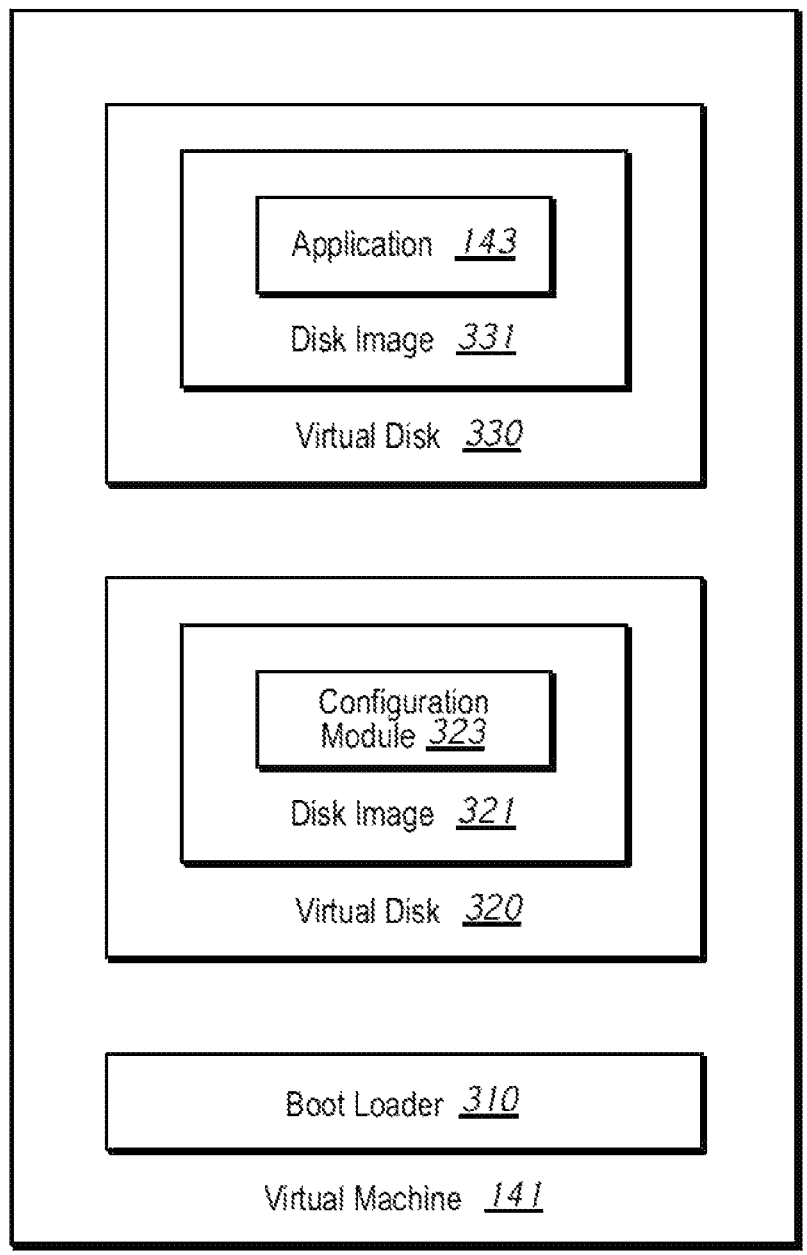
FIG. 3 is a block diagram illustrating a virtual machine, in accordance with some embodiments.

FIG. 3 is a diagram illustrating a VM 141, in accordance with some embodiments. The VM 141 may be a VM that is unable to host an agent (e.g., due to the software environment of the VM 141). The VM 141 may include a boot loader 310, a virtual disk 320, and a virtual disk 330. The virtual disk 320 includes a disk image 321 and the virtual disk 330 includes a disk image 331. The disk image 321 includes configuration module 323 and the disk image 331 includes application 143. The disk images 321 and 331 may also include other items such as files, an operating system, other applications, software components, software modules, etc. The VM 141 may store the disk images 321 and 331 in different virtual disks 320 and 330 because the VM 141 may not allow the disk images 321 and 331 to be stored in different partitions of a single virtual disk.

In one embodiment, virtual disks 320 and 330 may be virtualizations of physical hard disks. For example, virtual disk 320 may be a virtualization of a magnetic disk drive. In another example, the virtual disk 330 may be a virtualization of a solid state disk drive. In another embodiment, the disk images 321 and 331 may include the contents and/or structure of a hard disk. For example, the disk image 321 may include partition information (if the hard disk has multiple disk partitions), boot sectors, a file allocation table, an operating system, and/or applications (e.g., software).

The boot loader 310 may be software, hardware, firmware, or a combination thereof, that may be used to control the boot up or startup of the VM 141 (or of a computing device in general). For example, the boot loader 310 may be code that is executed by the VM 141 before initializing an operating system. The boot loader 310 may be configured to boot the VM 141 using disk images stored on different partitions and/or on different virtual disks. For example, the boot loader 310 may boot or start the VM 141 using the disk image 321 or the disk image 331.

In one embodiment, the boot loader 310 may be configured to boot the VM 141 using the disk image 321 (e.g., a first disk image) by default. For example, a parameter or setting used by the boot loader 310 may indicate to the boot loader 310 that the boot loader 310 should boot the VM 141 using the disk image 321. In one embodiment, the configuration module 323 may be part of an operating system of the disk image 321. In another embodiment, the configuration module 323 may be an application, a service, a daemon, a script, a software module, and/or a software component. As discussed above, the configuration module 323 may transmit a request to create or instantiate a proxy agent, to a proxy server. The configuration module 323 may also communicate with an orchestration server and/or a VM manager to obtain an identifier that may be used to identify the VM 141 and/or the application 143. The request to create or instantiate a proxy agent 113 may include the identifier or the configuration module 323 may transmit the identifier to the proxy server 110 separately. The configuration module 323 may also transmit a plugin module (e.g., plugin module 210 illustrated in FIG. 2) to the proxy server. In another embodiment, the configuration module 323 may also perform provisioning operations for the VM 141 (e.g., may provision the VM 141).

In one embodiment, the configuration module 323 may boot (e.g., reboot or restart) the VM 141 and may cause the VM 141 to boot using a disk image 331 (e.g., a second disk image) after transmitting the request to create or instantiate the proxy agent and/or performing provisioning operations. For example, the configuration module 323 may instruct the boot loader 310 to boot the VM 141 using the disk image 331 by modifying/updating a parameter or setting used by the boot loader 310 to determine which disk image should be used to boot the VM 141. The configuration module 323 may modify/update the parameter or setting to indicate that the boot loader 310 should boot the VM using the disk image 331. The VM 141 may boot (e.g., reboot) using the disk image 331 and may begin execution of the application 143.

Figure 4:
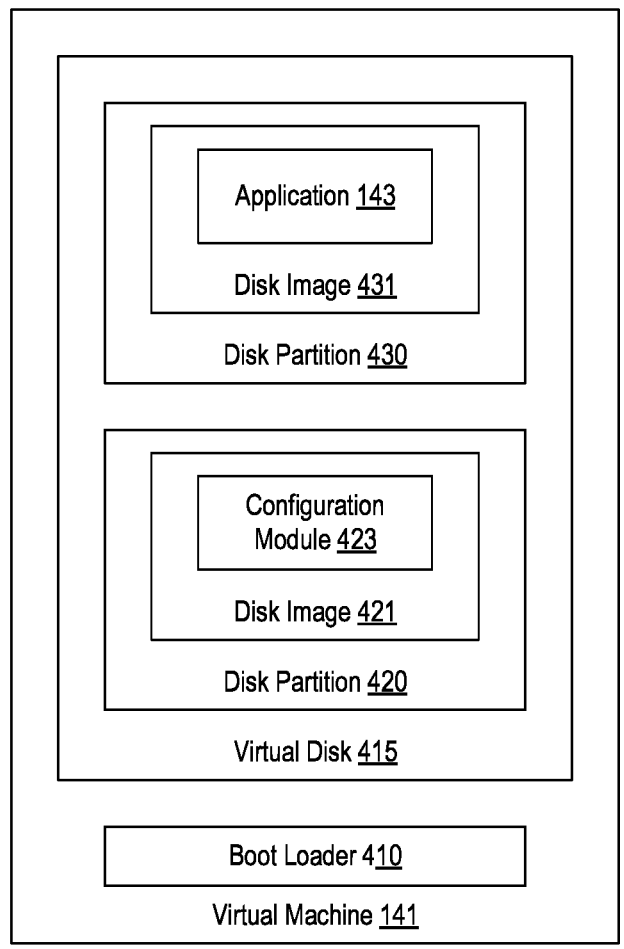
FIG. 4 is a block diagram illustrating a virtual machine, in accordance with some embodiments.

FIG. 4 is a diagram illustrating a VM 141, in accordance with some embodiments. The VM 141 may be a VM that is unable to host an agent (e.g., due to the software environment of the VM 141). The VM 141 may include a boot loader 410 and a virtual disk 415. The virtual disk 415 includes a disk partition 420 and a disk partition 430. The disk partition 420 includes a disk image 421 and the disk partition 430 includes a disk image 431. The disk image 421 includes configuration module 423 and the disk image 431 includes application 143. The disk images 421 and 431 may also include other items such as files, an operating system, other applications, software components, software modules, etc. The VM 141 may store the disk images 421 and 431 in different disk partitions 420 and 430 because the VM 141 may be unable to use multiple virtual disks.

The virtual disk 415 may be virtualizations of physical hard disk. The disk images 421 and 431 may include the contents and/or structure of a hard disk. The boot loader 410 may be software, hardware, firmware, or a combination thereof, that may be used to control the boot up or startup of the VM 141 (or of a computing device in general). The boot loader 410 may be configured to boot the VM 141 using disk images stored on different partitions and/or on different virtual disks.

The boot loader 410 may be configured to boot the VM 141 using the disk image 421 (e.g., a first disk image) by default. The configuration module 423 may be part of an operating system of the disk image 421 or may be an application, a service, a daemon, a script, a software module, and/or a software component. The configuration module 423 may transmit a request to create or instantiate a proxy agent to a proxy server (as discussed above). The configuration module 423 may also communicate with an orchestration server and/or a VM manager to obtain an identifier and may transmit the identifier to the orchestration server and/or a VM manager. The configuration module 423 may also transmit a plugin module (e.g., plugin module 210 illustrated in FIG. 2) to the proxy server. The configuration module 423 may further perform provisioning operations for the VM 141 (e.g., may provision the VM 141). The configuration module 423 may boot (e.g., reboot) the VM 141 and may cause the VM 141 to boot using disk image 431 (e.g., a second disk image) after transmitting the request to create or instantiate the proxy agent and/or performing provisioning operations (e.g., may instruct the boot loader 410 to boot using the disk image 431 as discussed above). The VM 141 may boot (e.g., reboot) using the disk image 431 and may begin execution of the application 143.

Figure 5:
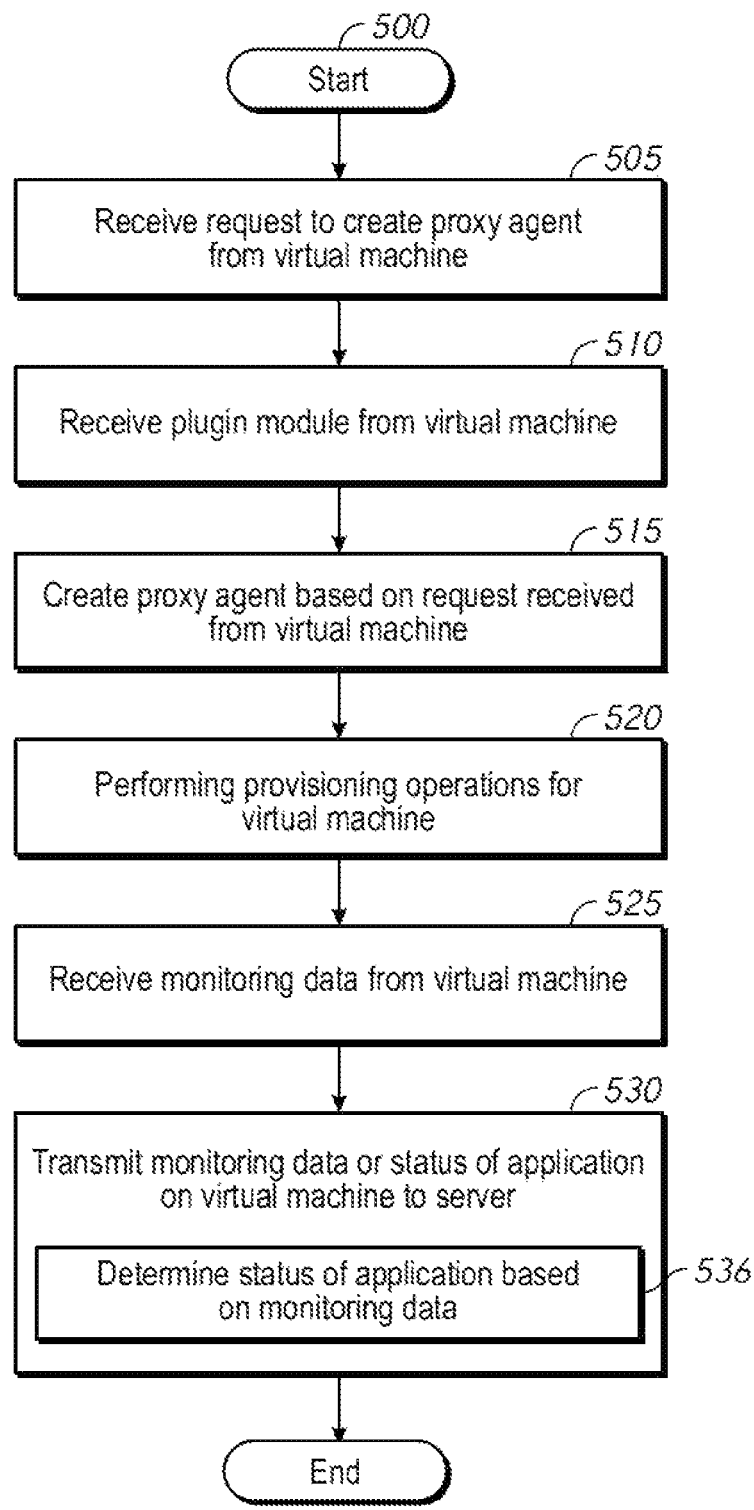
FIG. 5 is a flowchart representation of a method of creating a proxy agent, in accordance with some embodiments.

FIG. 5 is a flowchart representation of a method 500 of creating a proxy agent, in accordance with some embodiments. In some implementations, the method 500 may be performed by a proxy server and/or a proxy server module (e.g., proxy server 110 and/or a proxy server module 111 module illustrated in FIG. 1). The proxy server and/or a proxy server module may include hardware (e.g., circuitry, dedicated logic, programmable logic, microcode, etc.), software (e.g., instructions run on a processor to perform hardware simulation), firmware, or a combination thereof. Briefly, method 600 includes receiving a request to create a proxy agent, creating the proxy agent, and transmitting the status of an application or monitoring data to a server. The method 500 begins at block 505 where the method 500 includes receiving a request to create a proxy agent from a VM. For example, the request to create the proxy agent may be received from a first disk image (e.g., a configuration module on the first disk image) of the VM (as discussed above). In one embodiment, the request may also include an identifier that may be used to identify the VM and/or an application executing on the VM. In another embodiment, the identifier may be received separate from the request to create the proxy agent. At block 510, the method includes receiving a plugin module from the VM (as discussed above). For example, plugin module may be received from a first disk image (e.g., a configuration module on the first disk image) of the VM. The plugin module may allow the proxy server and/or proxy server module to communicate with the application on the VM (as discussed above).

The method 500 includes creating the proxy agent based on the request received from the VM at block 515. For example, the proxy server module and/or proxy server may instantiate an instance of the proxy agent or may begin execution of an instance of the proxy agent. As discussed above, the proxy agent may include the identifier (that may be used to identify the VM and/or an application executing on the VM). The proxy agent may also operate in conjunction with the plugin module (as discussed above). At block 520, the method 500 optionally includes performing provisioning operations for the VM (e.g., provisioning the VM). For example, the proxy server module and/or proxy server may configure parameters, settings, network ports, usernames, passwords, IP address, application settings, operating system settings, etc., of the VM and/or application, via the proxy agent/plugin module (as discussed above). The method 500 includes receiving monitoring data (e.g., messages, packets, data, etc., indicating the status of the application) from the VM (e.g., from the application executing on the VM) at block 525. For example, the proxy server module and/or proxy server may periodically transmit requests or periodically query for the monitoring data. In another example, the application may periodically transmit the monitoring data. At block 530, the method 500 includes transmitting a status of the application executing on the VM to a server (e.g., an orchestration server) or transmitting the monitoring data to the server. The method 500 also optionally includes determining the status of the application based on the monitoring data when the status of the application is transmitted to the server (at block 536).

Figure 6:
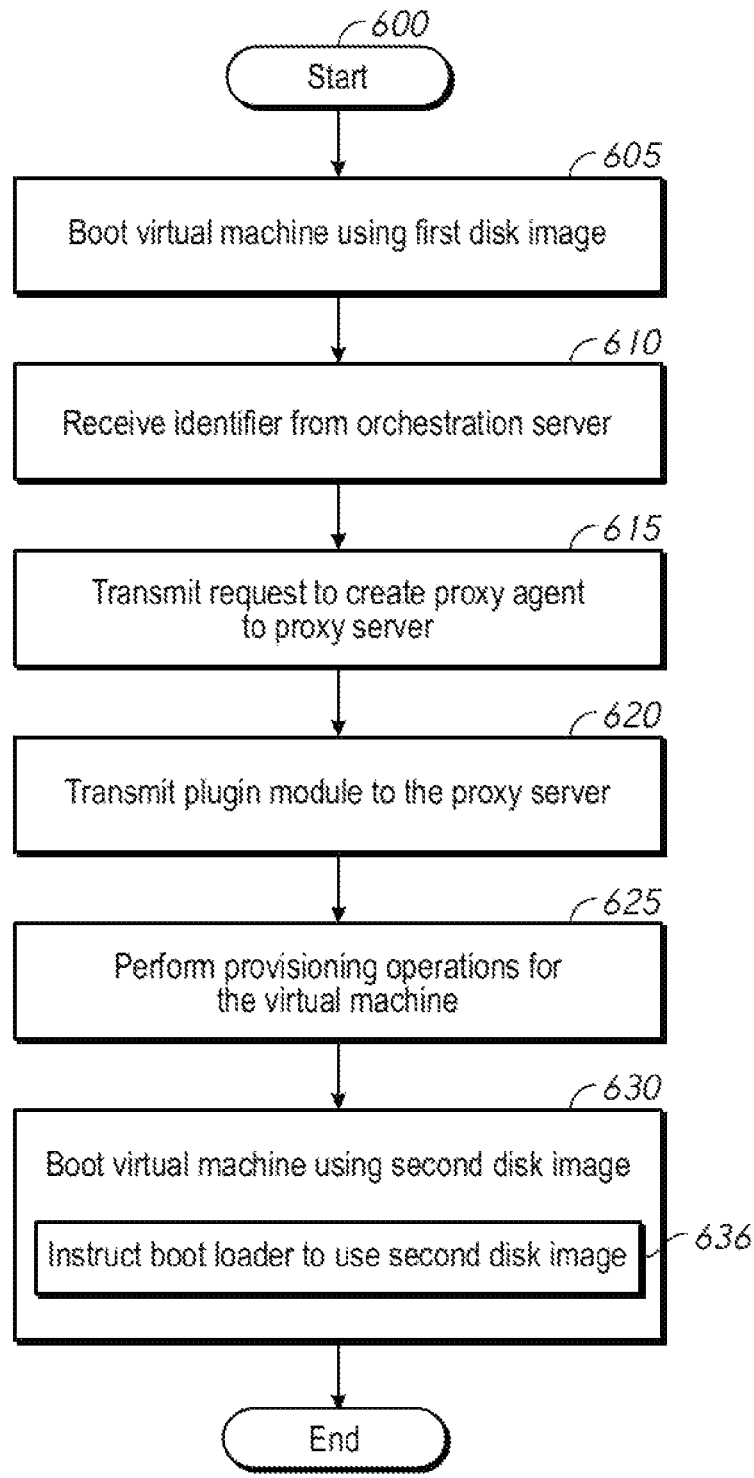
FIG. 6 is a flowchart representation of a method of booting a virtual machine, in accordance with some embodiments.

FIG. 6 is a flowchart representation of a method 600 of booting a VM, in accordance with some embodiments. In some implementations, the method 600 may be performed by a computing device, a hypervisor, and/or a VM (e.g., computing device 140, hypervisor 145, and/or VM 141 illustrated in FIG. 1). The computing device 140, a hypervisor 145, and/or VM 141 may include hardware (e.g., circuitry, dedicated logic, programmable logic, microcode, etc.), software (e.g., instructions run on a processor to perform hardware simulation), firmware, or a combination thereof. Briefly, method 600 includes booting the VM using a first disk image, transmitting a request to create a proxy agent, and booting the VM using a second disk image. The method 600 begins at block 605 where the method 600 includes booting the VM using a first disk image. For example, the VM may be booted using a first disk image that includes a configuration module (as discussed above). At block 610, the method 600 includes receiving an identifier from an orchestration server (e.g., receiving an identifier from orchestration server 120 illustrated in FIG. 1, as discussed above). The identifier may be used to identify the VM and/or an application executing on the VM (as discussed above). The method 600 includes transmitting a request to create a proxy agent to a proxy server at block 615. In one embodiment, the request may include the identifier. In another embodiment, the identifier may be transmitted separate from the request to create the proxy agent.

At block 620, the method 600 includes transmitting a plugin module to the proxy server. The plugin module may allow the proxy server and/or the orchestration server to communicate with the application on the VM (as discussed above). The method 600 may optionally perform provisioning operations at block 625. For example, the method 600 may configure parameters, settings, network ports, usernames, passwords, IP address, application settings, operating system settings, etc., of the VM and/or application (as discussed above). At block 630, the method 600 includes booting the VM using a second disk image. The method 600 may boot the VM using the second disk image by instructing a boot loader of the VM to boot the VM using the second disk image (as discussed above). The second disk image may include the application (as discussed above).

Figure 7:
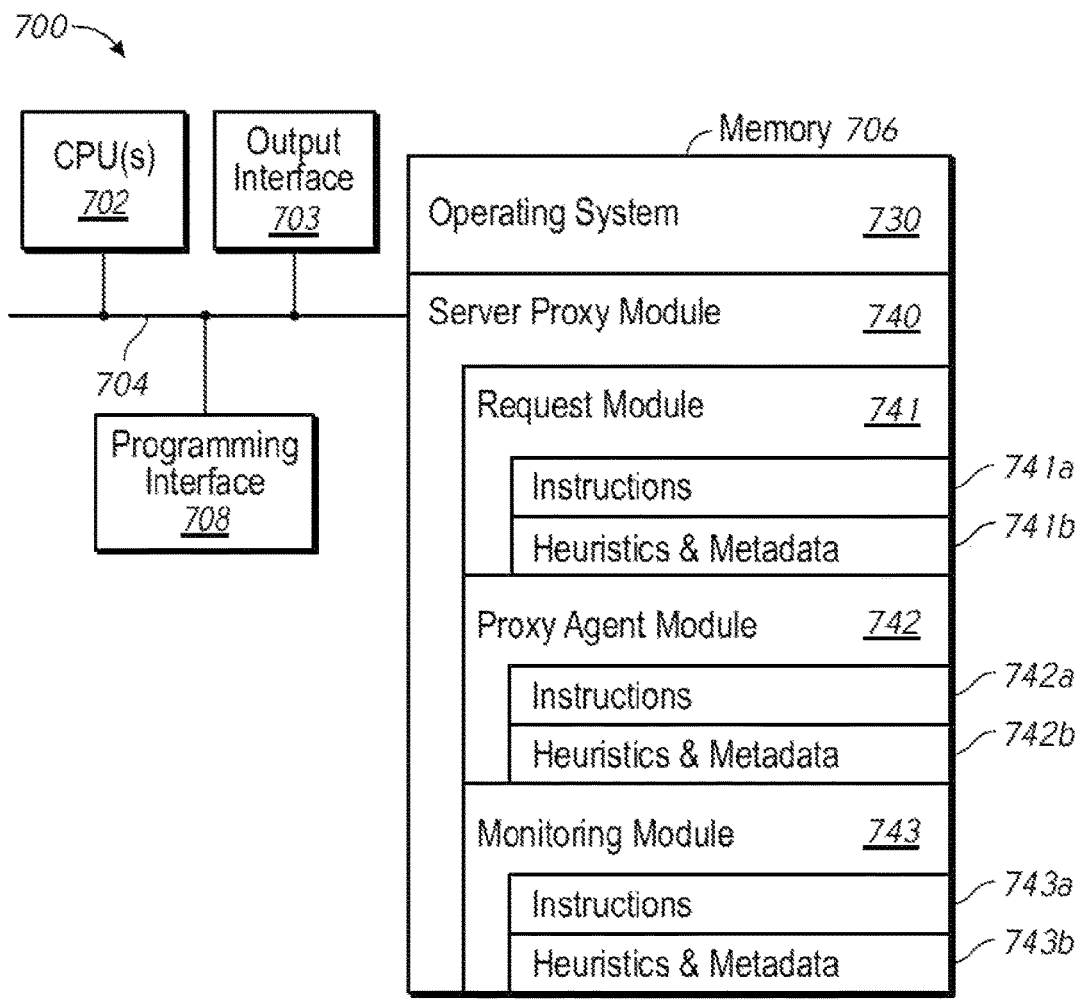
FIG. 7 is a block diagram of a computing device, in accordance with some embodiments.

FIG. 7 is a block diagram of a computing device 700, in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 700 includes one or more processing units (CPU's) 702 (e.g., processors), one or more output interfaces 703, a memory 706, a programming interface 708, and one or more communication buses 704 for interconnecting these and various other components.

In some embodiments, the communication buses 704 include circuitry that interconnects and controls communications between system components. The memory 706 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 706 optionally includes one or more storage devices remotely located from the CPU(s) 702. The memory 706 comprises a non-transitory computer readable storage medium. Moreover, in some embodiments, the memory 706 or the non-transitory computer readable storage medium of the memory 706 stores the following programs, modules and data structures, or a subset thereof including an optional operating system 730 and a proxy server module 740. In some embodiment, one or more instructions are included in a combination of logic and non-transitory memory. The operating system 730 includes procedures for handling various basic system services and for performing hardware dependent tasks. In some embodiments, the proxy server module 740 may be configured receive requests to create proxy agents, create proxy agents, receive monitoring data, and transmit a status or the monitoring data to a server. To that end, the proxy server module 740 includes request module 741, proxy agent module 742, and monitoring module 743.

In some embodiments, the request module 741 may receive requests to create a proxy agent, receive identifiers, and receive plugin modules. To that end, the request module 741 includes a set of instructions 741*a* and heuristics and metadata 741*b*. In some embodiments, the proxy agent module 742 may create proxy agents based on identifiers and/or plugin modules. To that end, the proxy agent module 742 includes a set of instructions 742*a* and heuristics and metadata 742*b*. In some embodiments, the monitoring module 743 may receive monitoring data, determine a status of an application, and/or transmit the status or monitoring data to a server. To that end, the monitoring module 743 includes a set of instructions 743*a* and heuristics and metadata 743*b*.

Although the proxy server module 740, the request module 741, the proxy agent module 742, and the monitoring module 743 are illustrated as residing on a single computing device 700, it should be understood that in other embodiments, any combination of the proxy server module 740, the request module 741, the proxy agent module 742, and the monitoring module 743 may reside on separate computing devices.

Figure 8:
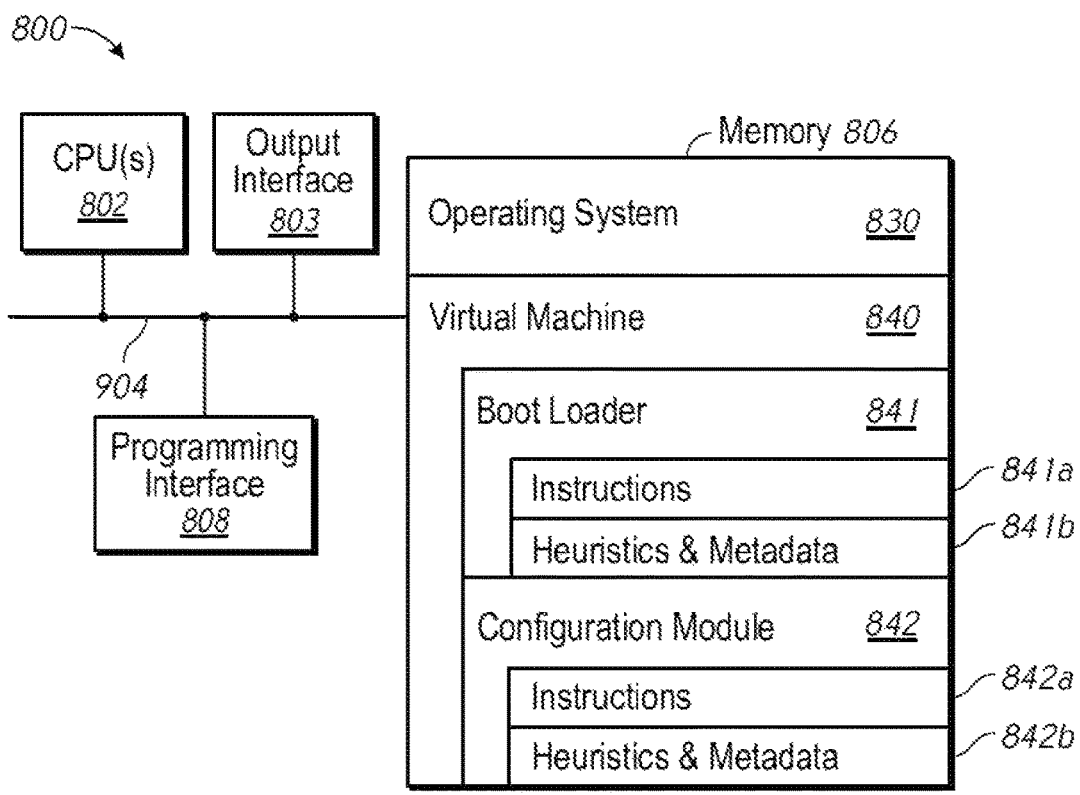
FIG. 8 is a block diagram of a computing device, in accordance with some embodiments.

FIG. 8 is a block diagram of a computing device 800, in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 800 includes one or more processing units (CPU's) 802 (e.g., processors), one or more output interfaces 803, a memory 806, a programming interface 808, and one or more communication buses 804 for interconnecting these and various other components.

In some embodiments, the communication buses 804 include circuitry that interconnects and controls communications between system components. The memory 806 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 806 optionally includes one or more storage devices remotely located from the CPU(s) 802. The memory 806 comprises a non-transitory computer readable storage medium. Moreover, in some embodiments, the memory 806 or the non-transitory computer readable storage medium of the memory 806 stores the following programs, modules and data structures, or a subset thereof including an optional operating system 830 and a server module 840. In some embodiment, one or more instructions are included in a combination of logic and non-transitory memory. The operating system 830 includes procedures for handling various basic system services and for performing hardware dependent tasks. The computing device may also include a hypervisor (not shown in FIG. 8), as discussed above. In some embodiments, the virtual machine 840 may be configured to boot the virtual machine using different disk images, transmit requests to create proxy agents, and transmit plugin modules. To that end, the virtual machine 840 includes boot loader 841 and configuration module 842.

In some embodiments, the boot loader 841 may boot the virtual machine 840 using different disk images (e.g., a first disk image and a second disk image). To that end, the boot loader 841 includes a set of instructions 841*a* and heuristics and metadata 841*b*. In some embodiments, the configuration module 842 may transmit requests to create proxy agents, receive identifiers, perform provisioning operations, and transmit plugin modules. To that end, the configuration module 842 includes a set of instructions 842*a* and heuristics and metadata 842*b*.

Moreover, FIGS. 7 through 8 are intended more as functional description of the various features which may be present in a particular embodiment as opposed to a structural schematic of the embodiments described herein. As recognized by those of ordinary skill in the art, items shown separately could be combined and some items could be separated. For example, some functional modules shown separately in FIGS. 7 through 8 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some aspects of the systems and methods described herein can advantageously be implemented using, for example, computer software, hardware, firmware, or any combination of computer software, hardware, and firmware. Computer software can comprise computer executable code stored in a computer readable medium (e.g., non-transitory computer readable medium) that, when executed, performs the functions described herein. In some embodiments, computer-executable code is executed by one or more general purpose computer processors. A skilled artisan will appreciate, in light of this disclosure, that any feature or function that can be implemented using software to be executed on a general purpose computer can also be implemented using a different combination of hardware, software, or firmware. For example, such a module can be implemented completely in hardware using a combination of integrated circuits. Alternatively or additionally, such a feature or function can be implemented completely or partially using specialized computers designed to perform the particular functions described herein rather than by general purpose computers.

Multiple distributed computing devices can be substituted for any one computing device described herein. In such distributed embodiments, the functions of the one computing device are distributed (e.g., over a network) such that some functions are performed on each of the distributed computing devices.

Some embodiments may be described with reference to equations, algorithms, and/or flowchart illustrations. These methods may be implemented using computer program instructions executable on one or more computers. These methods may also be implemented as computer program products either separately, or as a component of an apparatus or system. In this regard, each equation, algorithm, block, or step of a flowchart, and combinations thereof, may be implemented by hardware, firmware, and/or software including one or more computer program instructions embodied in computer-readable program code logic. As will be appreciated, any such computer program instructions may be loaded onto one or more computers, including without limitation a general purpose computer or special purpose computer, or other programmable processing apparatus to produce a machine, such that the computer program instructions which execute on the computer(s) or other programmable processing device(s) implement the functions specified in the equations, algorithms, and/or flowcharts. It will also be understood that each equation, algorithm, and/or block in flowchart illustrations, and combinations thereof, may be implemented by special purpose hardware-based computer systems which perform the specified functions or steps, or combinations of special purpose hardware and computer-readable program code logic means.

Furthermore, computer program instructions, such as embodied in computer-readable program code logic, may also be stored in a computer readable memory (e.g., a non-transitory computer readable medium) that can direct one or more computers or other programmable processing devices to function in a particular manner, such that the instructions stored in the computer-readable memory implement the function(s) specified in the block(s) of the flowchart(s). The computer program instructions may also be loaded onto one or more computers or other programmable computing devices to cause a series of operational steps to be performed on the one or more computers or other programmable computing devices to produce a computer-implemented process such that the instructions which execute on the computer or other programmable processing apparatus provide steps for implementing the functions specified in the equation(s), algorithm(s), and/or block(s) of the flowchart(s).

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list. The word "exemplary" is used exclusively herein to mean "serving as an example, instance, or illustration." Any implementation described herein as "exemplary" is not necessarily to be construed as preferred or advantageous over other implementations.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact. Also as used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

Further as used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:
    at a host computing device configured to communicate with a server via a network,
        booting a virtual machine on the host computing device using a first disk image having a configuration module with use of a boot loader of the virtual machine, wherein the virtual machine of the host computing device is unable to host a proxy agent;

executing the configuration module of the first disk image to cause a request to create a proxy agent to be transmitted to the server for installation of the proxy agent at the server, wherein the proxy agent is configured to monitor an application of the virtual machine over the network; and rebooting the virtual machine on the host computing device using a second disk image with use of the boot loader of the virtual machine, wherein the second disk image includes the application to be monitored over the network via the proxy agent.

2. The method of claim 1, wherein executing the configuration module of the first disk image further comprises:

receiving an identifier for the virtual machine from a managing server, wherein the request to create the proxy agent includes the identifier.

3. The method of claim 1, further comprising:
at the host computing device,
provisioning the virtual machine.

4. The method of claim 1, further comprising: at the host computing device, executing the configuration module of the first disk image to cause a plugin module to be transmitted to the server for execution of the plugin module on the server, wherein the plugin module is configured to operate in conjunction with the proxy agent at the server to facilitate communication between the server and the application of the virtual machine.

5. The method of claim 1, wherein the disk image is located in a partition of the virtual machine and wherein the second disk image is located in a second partition of the virtual machine.

6. The method of claim 1, wherein the disk image is located in a virtual disk of the virtual machine and wherein the second disk image is located in a second virtual disk of the virtual machine.

7. A host computing device configured to communicate with a server via a network, the host computing device comprising:

a non-transitory computer readable memory storing instructions;

a processor programmed to execute the instructions in memory to perform operations comprising:

booting a virtual machine on the host computing device using a first disk image having a configuration module with use of a boot loader of the virtual machine, wherein the virtual machine of the host computing device is unable to host a proxy agent;

executing the configuration module of the first disk image to cause a request to create a proxy agent to be transmitted to the server for installation of the proxy agent at the server, wherein the proxy agent is configured to monitor an application of the virtual machine over the network; and rebooting the virtual machine on the host computing device using a second disk image with use of the boot loader of the virtual machine, wherein the second disk image includes the application to be monitored over the network via the proxy agent.

8. The host device of claim 7, wherein executing the configuration module of the first disk image further comprises:

receiving an identifier for the virtual machine from a managing server, wherein the request to create the proxy agent includes the identifier.

9. The host device of claim 7, the operations further comprising:
provisioning the virtual machine.

10. The host device of claim 7, the operations further comprising:

executing the configuration module of the first disk image to cause a plugin module to be transmitted to the server for execution of the plugin module on the server, wherein the plugin module is configured to operate in conjunction with the proxy agent at the server to facilitate communication between the server and the application of the virtual machine.

11. The host device of claim 7, wherein the disk image is located in a partition of the virtual machine and wherein the second disk image is located in a second partition of the virtual machine.

12. The host device of claim 7, wherein the disk image is located in a virtual disk of the virtual machine and wherein the second disk image is located in a second virtual disk of the virtual machine.

13. A non-transitory computer readable media storing instructions which when executed by a host computing device configured to communicate with a server via a network cause the host computing device to perform operations comprising:

booting a virtual machine on the host computing device using a first disk image having a configuration module with use of a boot loader of the virtual machine, wherein the virtual machine of the host computing device is unable to host a proxy agent;

executing the configuration module of the first disk image to cause a request to create a proxy agent to be transmitted to the server for installation of the proxy agent at the server, wherein the proxy agent is configured to monitor an application of the virtual machine over the network; and rebooting the virtual machine on the host computing device using a second disk image with use of the boot loader of the virtual machine, wherein the second disk image includes the application to be monitored over the network via the proxy agent.

14. The media of claim 13, wherein executing the configuration module of the first disk image further comprises:

receiving an identifier for the virtual machine from a managing server, wherein the request to create the proxy agent includes the identifier.

15. The media of claim 13, the operations further comprising:
provisioning the virtual machine.

16. The media of claim 13, the operations further comprising:

executing the configuration module of the first disk image to cause a plugin module to be transmitted to the server for execution of the plugin module on the server, wherein the plugin module is configured to operate in conjunction with the proxy agent at the server to facilitate communication between the server and the application of the virtual machine.

17. The media of claim 13, wherein the disk image is located in a partition of the virtual machine and wherein the second disk image is located in a second partition of the virtual machine.

18. The media of claim 13, wherein the disk image is located in a virtual disk of the virtual machine and wherein the second disk image is located in a second virtual disk of the virtual machine.

\* \* \* \* \*